United States Patent [19]

LeClerc et al.

[11] Patent Number: 5,067,997
[45] Date of Patent: Nov. 26, 1991

[54] METHOD FOR DETERMINING ADHERENCE TO A VEHICLE PANEL SURFACE

[75] Inventors: David L. LeClerc, Lake Orien; Wayne A. Conti, Troy, both of Mich.

[73] Assignee: Chrysler Corporation, Highland Park, Mich.

[21] Appl. No.: 578,376

[22] Filed: Sep. 7, 1990

[51] Int. Cl.⁵ .......................................... G01M 19/00
[52] U.S. Cl. .................................. 156/64; 156/245; 73/865.8; 264/40.1; 264/221; 264/225
[58] Field of Search ............... 156/245, 64; 73/865.8; 264/40.1, 221, 225

[56] References Cited

U.S. PATENT DOCUMENTS

| | | | |
|---|---|---|---|
| 2,601,703 | 3/1949 | Sawyer | 264/40.1 |
| 3,379,812 | 11/1964 | Yakovou | 264/227 |
| 3,558,886 | 1/1971 | Carver | 156/64 |
| 3,903,339 | 9/1975 | Brockway et al. | 427/407.2 |
| 4,398,984 | 8/1983 | Uchiyama et al. | 156/245 |

Primary Examiner—Hubert C. Lorin
Assistant Examiner—Merrick Dixon
Attorney, Agent, or Firm—Edward A. Craig

[57] ABSTRACT

A method for determining the degree of adherence to a non-flat, opaque vehicle panel surface of a component adhered thereto. The method includes providing an integrally cast clear matched surface in the panel so that the contacting surfaces of the component may be directly viewed.

2 Claims, 3 Drawing Sheets

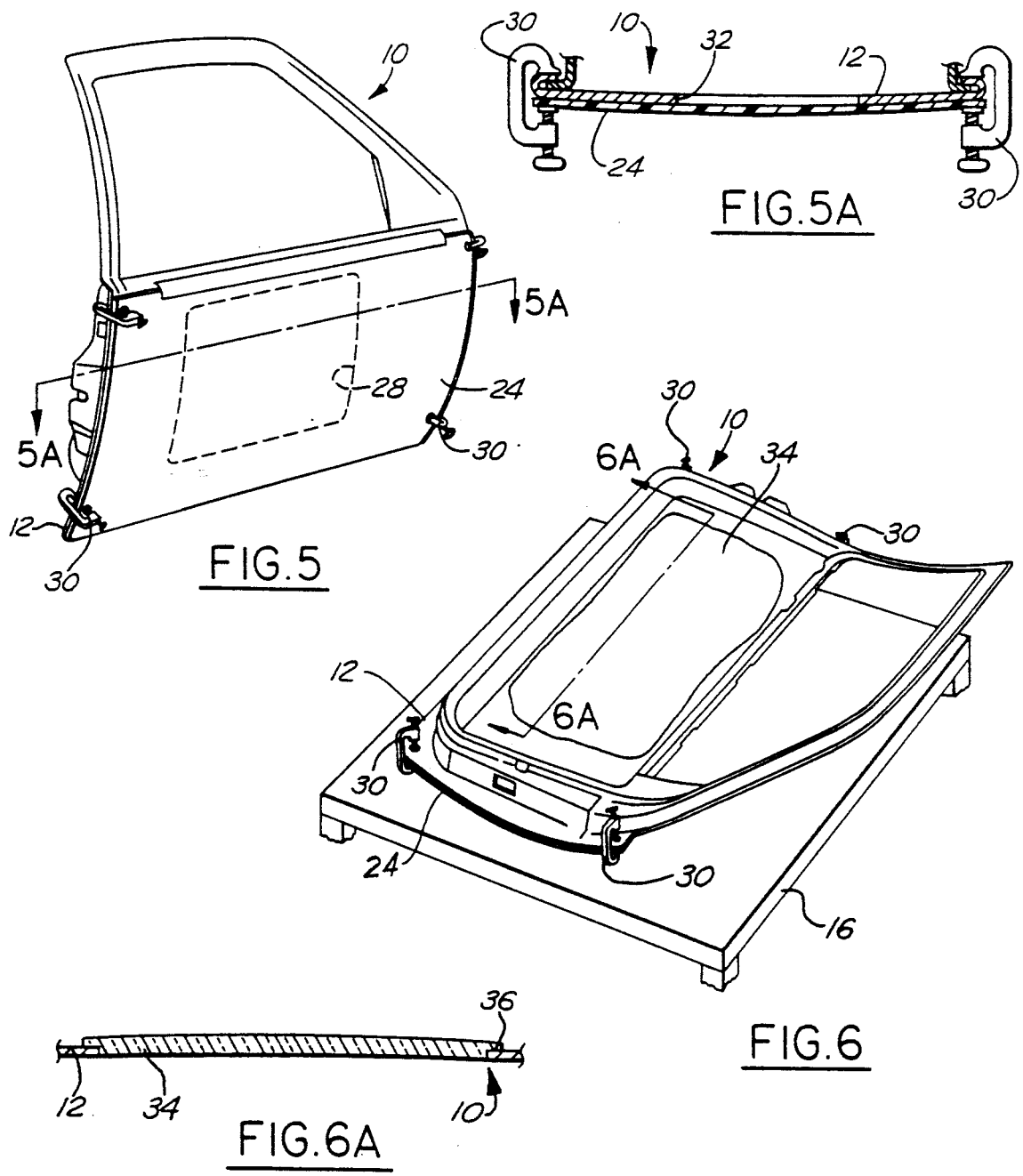

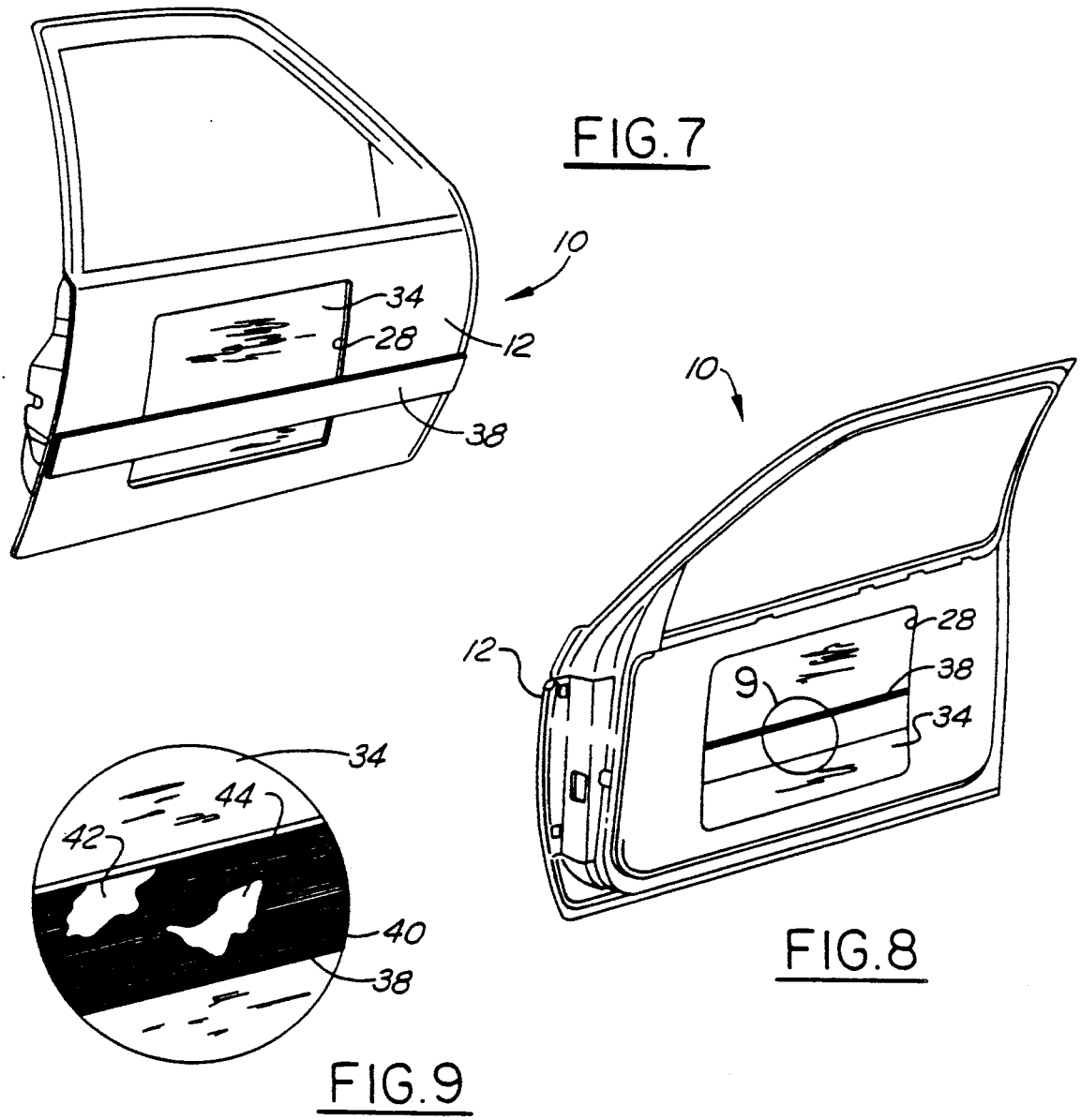

METHOD FOR DETERMINING ADHERENCE TO A VEHICLE PANEL SURFACE

BACKGROUND OF THE INVENTION

In current manufacture of vehicles, many exterior components are affixed to the vehicle exterior body surface by use of adhesive material as opposed to mechanical fasteners of the type which were extensively used in the past. The components secured to the body exterior surface may be of different sorts, and include such things as trim, name plates, and other indicia. The use of adhesives for securing such components to vehicles is advantageous from a production standpoint as well as the fabrication standpoint since openings in mechanical fasteners do not have to be provided. Modern adhesive materials are of high enough quality to firmly secure such components in place providing that adequate contact is made between the adhered surfaces.

One problem which has been encountered is inadequate surface contact between the component and vehicle body surface when such components are adhered to curved body panels. It is not possible to inspect the adhesion quality after the component has been secured in place with adhesive because the adhesive and the contacting surfaces are not available for inspection, being hidden by the opaqueness of the component and vehicle body panel. This has resulted in some cases in not obtaining the desired degree of adherence.

In accordance with the present invention, a method is provided for visually inspecting the degree of adherence of a component to a vehicle body surface. Basically, the method involves the provision of a clear plastic window which is cast into an opening made in the body panel. The adhesive contact of the component with the surface of the clear plastic window may be seen through the window to thus determine whether or not the desired degree of adherence has been obtained.

SUMMARY OF THE INVENTION

A method for determining the degree of adherence to a non-flat opaque vehicle panel surface of a component adhered thereto is provided. The method comprises the step of first marking a surface area of interest on the vehicle body panel exterior curved surface. Then, flowable plastic material is applied to the vehicle body panel exterior surface over the area of interest and surrounding areas adjacent thereto. The plastic material is then cured to a hardened sheet to form a splash. The splash is removed from the vehicle body panel. The vehicle body panel is then cut along the periphery of the marked area with the cutaway portion being removed from the vehicle body panel to leave an opening in the shape of the marked area.

The splash is then fastened back onto the exterior surface of the vehicle body panel in its original position thereby covering the opening. A layer of flowable clear plastic material is then cast into the opening from the interior side of the vehicle body panel. The clear plastic material is cured to a hardened state. The splash is then removed from the vehicle body panel. The designated component is then adhesively secured to the exterior surface of the vehicle body panel over the layer of clear plastic material. The adhered component is then visually inspected through the layer of clear plastic material from the interior side of the vehicle body panel to determine the degree of adhesion. Preferably, the clear plastic material is cast over the interior surface area surrounding the opening to form a flange for retaining the hardened plastic layer in place.

IN THE DRAWINGS

FIG. 5 is a view in perspective of the vehicle body panel after the splash has been secured to the exterior surface thereof;

FIG. 5A is a view in perspective taken substantially along the line 5A—5A of FIG. 5 looking in the direction of the arrows;

FIG. 6 is a view in perspective illustrating the step of casting a layer of flowable clear plastic material into the opening formed in the vehicle body panel;

FIG. 6A is a sectional view taken substantially along the line 6A—6A looking in the direction of the arrows;

FIG. 7 illustrates in perspective the door with a trim element adhered thereto;

FIG. 8 illustrates the interior of the door of FIG. 7; and

FIG. 9 illustrates the encircled area of FIG. 8 on an enlarged scale.

DETAILED DESCRIPTION OF A PREFERRED EMBODIMENT

Figure 1:
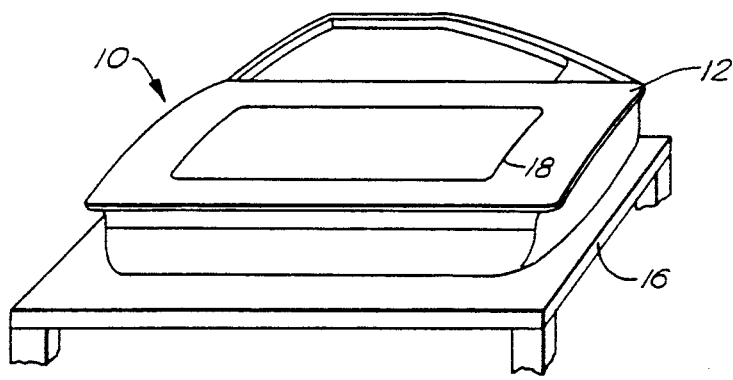
FIG. 1 is a view in perspective of a vehicle body panel exterior surface illustrating the step of marking a surface area of interest thereon.

Referring to FIG. 1, a car door 10 is illustratively shown as the body component upon which the method of the present invention is used. The method may be used in connection with other body components as desired. The door 10 has an exterior vehicle body panel 12 and interior panel structure 14. Portions of the interior panel structure 14 are removed as necessary in order to gain access to the interior surface of the panel 12. The panel 12 is illustratively curved. The method is adapted for use with curved panels or with panels having other forms of irregular surfaces. Flat surfaces do not normally pose a problem.

A door 10 is conveniently supported by a table structure 16 with the exterior surface of the panel 12 facing upwardly. The area of interest is marked or scribed as at 18. This is the area that it is wished to determine the degree of adherence of an adhered component such as a trim element.

After the area 18 has been marked, the surface of the panel 12 is cleaned to remove any dust, dirt, or other contaminants. A release agent such as a paste wax is applied to the surface and the surface is polished as needed. The surface is oriented to the horizontal plane as much as possible. A releasing film, such as a silicone spray, or other suitable parting agent, is applied directly to the exterior surface of the panel 12. If needed, sheet wax may be applied, and wood dikes or other suitable dikeing materials may be provided on the surface of the panel 12.

Figure 2:
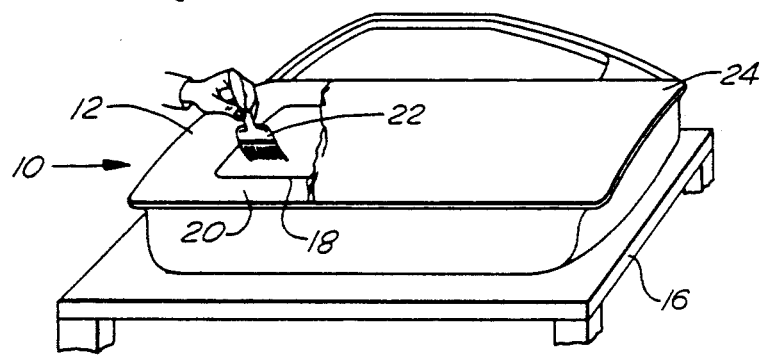
FIG. 2 is a view in perspective of the vehicle body panel illustrating the step of applying a flowable plastic material thereon which cures to a hardened sheet to form a splash.
Figure 3:
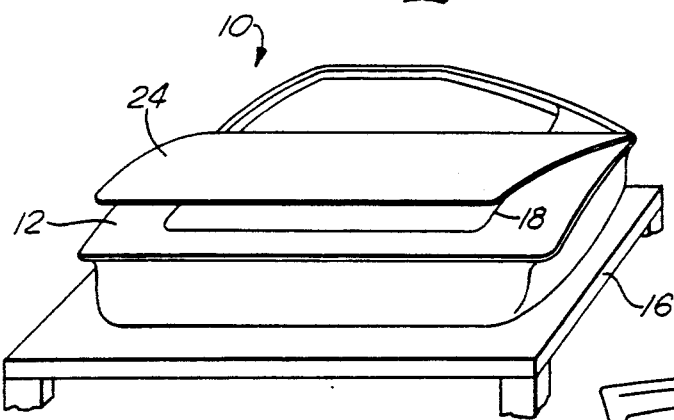
FIG. 3 is a view in perspective illustrating removal of the splash.

After the surface has been prepared, a casting resin such as an epoxy is applied as shown in FIG. 2. This material is a flowable plastic material and is applied over the area 18 of interest as well as surrounding area 20 adjacent thereto. The plastic may be applied manually as with a brush 22 as illustrated in FIG. 2. The plastic may be reinforced as desired as, for example, with a weaved glass cloth. Such reinforcing materials should be used as required to assure strength and dimensional stability of the final application. When reinforcing materials are used, a thin layer of the casting resin should be applied just before application of the reinforcing material. The reinforcing material should then be thoroughly impregnated with the casting resin.

In any event, a layer of plastic is applied as illustrated in FIG. 2. The plastic used contains a hardener that results in curing of the plastic to a hardened sheet to form what is termed a "splash" 24 which mates with the surface configuration of the panel 12. In the case of complex surfaces, a multiple piece splash may be made. Such a splash may be fabricated in stages to allow for the complex configuration. The splash should be completely cured between each stage to assure minimal distortion. The splash, whether multiple piece or single piece, should be completely cured before an attempt to separate it from the panel 12 is made. As required, splash edges may be cut to size and deburred. Multiple piece splashes may be closed and fitted for mechanical fastening. As necessary, the splash surface should be lightly sanded and/or polished to a high gloss level using a rubbing compound or polish to provide a smooth surface.

Figure 4:
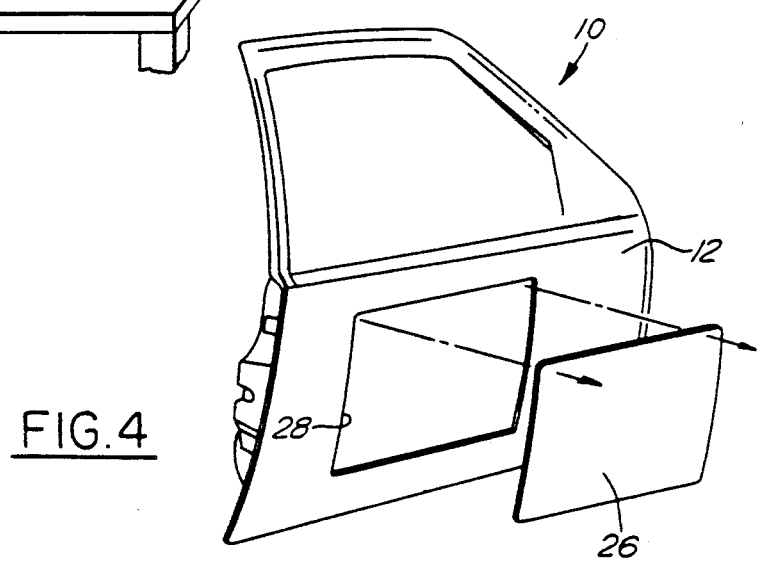
FIG. 4 is a view in perspective illustrating cutting the vehicle body panel to form an opening in the shape of the marked area.

After the splash 24 has been removed, the panel portion 26 which exists within the marked area 18 is cut away from the panel 12 as shown in FIG. 4 to leave an opening 28. The opening 28 may be made by using conventional cutting tools.

After the opening 28 has been formed, the splash 24 is fastened back onto the exterior surface of the vehicle body panel 12 in its original position thereby covering the opening 28. The splash 28 is illustratively fixed in place by use of clamps 30. Prior to fastening the splash in place, the surface area facing the panel 12 should be cleaned as required and a releasing agent such as a paste wax should be applied. A releasing film such as a silicone spray should also be used over the releasing agent.

Referring now to FIG. 6, the door 10 with splash 24 in place is supported by the table structure 16 in as horizontal a position as possible. The interior surface of panel 12 faces upwardly thus exposing a space 32 (FIG. 5A) into which a layer 34 of flowable plastic material is cast. The plastic material may be, for example, an epoxy or equivalent material. The key thing is that the plastic should be clear to result in an integrally cast clear matched surface after it hardens. The plastic may be applied in stages for maximum clarity while at the same time re-orienting the splash between stages if necessary. The plastic material is allowed to cure completely between each stage. After the plastic material has completely cured to a hardened state, the splash 24 is removed. As will be noted in FIG. 6A, the plastic material is cast over the surface area surrounding the opening 28 to form a flange system 36 which retains the hardened clear plastic layer 34 in place.

In the illustrated embodiment, a door trim element 38 is the designated component to be tested for adherence over the opening 28 as shown in FIG. 7. The trim element 38 has an adhesive applied to its contacting surface. The adhesive used may be a conventional pressure sensitive double faced tape, an adhesive film or the like. The element 38 illustrated is fabricated of plastic. However it should be appreciated that the method is applicable to components made of other materials such as forged aluminum or zinc die castings.

Referring to FIG. 8, after the trim element 38 has been adhered in place, as shown in FIG. 7, the adhering surface is viewed through the layer 34. What is of interest in inspecting the adhered component surface is the degree of adhesion. This is done through what is termed the evaluation of adhesive wetout which is an indication of intimate contact or bond. FIG. 9 illustrates the area encircled in FIG. 8. The shaded area 40 is intimately bonded. The clear areas 42, 44 do not have the desired bond. The entire bond may, of course, be adequate even if all areas are not totally adhered. Inspection may be by a practiced eye or instrumentation such as a compensating polar planimeter or an electronic digital planimeter may be used.

We claim:

1. A method for determining the degree of adherence to a non-flat, opaque vehicle panel surface of a component adhered thereto comprising the steps of:
   a. marking a surface area of interest on the vehicle panel exterior surface;
   b. applying flowable plastic material to the vehicle panel exterior surface over the area of interest and surrounding areas adjacent thereto;
   c. curing the plastic material to a hardened sheet to form a splash and removing the splash from the vehicle panel;
   d. cutting the vehicle panel along the periphery of the marked area and removing that portion from the vehicle panel leaving an opening in the shape of the marked area;
   e. fastening the splash back onto the exterior surface of the vehicle panel in its original position thereby covering the opening;
   f. casting a layer of flowable clear plastic material into the opening from the interior side of the vehicle panel and curing the clear plastic material to a hardened state;
   g. removing the splash from the vehicle panel;
   h. adhesively securing the component to the exterior surface of the vehicle panel over the layer of clear plastic material; and
   i. visually inspecting the adhered component through the layer of clear plastic material from the interior side of the vehicle panel to determine the degree of adhesion.

2. The method set forth in claim 1 wherein the clear plastic material is cast over the surface area surrounding the opening to form a flange for retaining the hardened clear plastic layer in place.

* * * * *